US010229317B2

(12) United States Patent
Rajkumar et al.

(10) Patent No.: US 10,229,317 B2
(45) Date of Patent: Mar. 12, 2019

(54) SELECTIVELY DOWNLOADING TARGETED OBJECT RECOGNITION MODULES

(71) Applicant: X DEVELOPMENT LLC, Mountain View, CA (US)

(72) Inventors: Nareshkumar Rajkumar, San Jose, CA (US); Stefan Hinterstoisser, Mountain View, CA (US); Max Bajracharya, Millbrae, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 15/230,412

(22) Filed: Aug. 6, 2016

(65) Prior Publication Data

US 2018/0039835 A1    Feb. 8, 2018

(51) Int. Cl.
*G06K 9/00* (2006.01)
*B25J 9/16* (2006.01)
*G06T 1/00* (2006.01)
*G06K 9/62* (2006.01)
*H04W 4/60* (2018.01)
(Continued)

(52) U.S. Cl.
CPC ........ *G06K 9/00664* (2013.01); *B25J 9/1697* (2013.01); *G06K 9/00979* (2013.01); *G06K 9/00993* (2013.01); *G06K 9/628* (2013.01); *G06T 1/0014* (2013.01); *H04W 4/025* (2013.01);
(Continued)

(58) Field of Classification Search
CPC ............................ G06K 9/00664; B25J 9/1697
See application file for complete search history.

(56) References Cited

U.S. PATENT DOCUMENTS

| 8,447,863 B1 | 5/2013 | Francis et al. |
| 2012/0316680 A1* | 12/2012 | Olivier ................. G05D 1/0246 700/258 |
| 2013/0345870 A1* | 12/2013 | Buehler ................. B25J 9/0087 700/257 |

OTHER PUBLICATIONS

McCormac, John B. "3D Object Detection for Mobile Robots." Imperial College London, Department of Computing. Submitted in partial fulfilment of the requirements for the MSc Degree in Computing Science of Imperial College London. Sep. 2, 2014. 70 pages. www.doc.ic.ac.uk/teaching/distinguished-projects/2014/j.mccormac.pdf.

(Continued)

*Primary Examiner* — Ruiping Li
(74) *Attorney, Agent, or Firm* — Middleton Reutlinger (57) ABSTRACT

Methods, apparatus, systems, and computer-readable media are provided for downloading targeted object recognition modules that are selected from a library of candidate targeted object recognition modules based on various signals. In some implementations, an object recognition client may be operated to facilitate object recognition for a robot. It may download targeted object recognition module(s). Each targeted object recognition module may facilitate inference of an object type or pose of an observed object. The targeted object module(s) may be selected from a library of targeted object recognition modules based on various signals, such as a task to be performed by the robot. The object recognition client may obtain vision data capturing at least a portion of an environment in which the robot operates. The object recognition client may determine, based on the vision data and the downloaded object recognition module(s), information about an observed object in the environment.

17 Claims, 5 Drawing Sheets

(51) Int. Cl.
*H04W 4/02* (2018.01)
*H04W 4/80* (2018.01)

(52) U.S. Cl.
CPC ............... *H04W 4/60* (2018.02); *H04W 4/80* (2018.02); *Y10S 901/47* (2013.01)

(56) References Cited

OTHER PUBLICATIONS

Beksi et al. "CORE: A Cloud-Based Object Recognition Engine for Robotics." Intelligent Robots and Systems (IROS), 2015 IEEE/RSJ International Conference. IEEE, 2015. 6 pages.
Lai et al. "Object Recognition in 3D Point Clouds Using Web Data and Domain Adaptation." The International Journal of Robotics Research 29.8 (2010): 1019-1037.
Burski et al. The Use of Cloud Computing in Mobile Robotics. Problemy Eksploatacji. 2014. 12 pages.
Kehoe et al. "Cloud-Based Robot Grasping with the Google Object Recognition Engine." Robotics and Automation (ICRA), 2013 IEEE International Conference on. IEEE, 2013. 7 pages.
Jensfelt et al. "Augmenting Slam with Object Detection in a Service Robot Framework." Roman 2006-The 15th IEEE International Symposium on Robot and Human Interactive Communication. IEEE, 2006. 6 pages.
Chamberlain et al. "A Distributed Robotic Vision Service." Proceedings of the International Conference on Robotics and Automation (ICRA). 2016. 9 pages.
Jia et al. "Robotic Object Detection: Learning to Improve the Classifiers Using Sparse Graphs for Path Planning." IJCAI Proceedings-International Joint Conference on Artificial Intelligence. vol. 22. No. 3. 2011. 7 pages.
International Search Report and Written Opinion of PCT U.S. Appl. No. PCT/US2017/045584; 11 pages Oct. 19, 2017.
Tenorth, M. et al. "The RoboEarth Language: Representing and Exchanging Knowledge about Actions, Objects, and Environments". 2012 IEEE International Conference on Robotics and Automation; RiverCenter, Saint Paul, MN; May 14-18, 2012; 6 pages.
Park, J. et al. "A New Object Recognition System for Service Robots in the Smart Environment". 2007 International conference on Control, Automation and Systems; Coex, Seoul, Korea; Oct. 17-20, 2007; 5 pages.

\* cited by examiner

SELECTIVELY DOWNLOADING TARGETED OBJECT RECOGNITION MODULES

BACKGROUND

Object recognition is a fundamental aspect of robot operation. However, object recognition tends to be resource-intensive, and robots are typically resource-constrained. A general purpose robot may be called upon to act upon a plethora of different object types. It may not be feasible for the robot to store all of the object models and/or other data/routines needed to classify all possible objects locally. Moreover, applying a large number of object models to each unclassified object observed in an environment may overwhelm the robot's resources, e.g., causing the robot to behave sluggishly, unresponsively, and/or erratically.

SUMMARY

The present disclosure is generally directed to methods, apparatus, and computer-readable media (transitory and non-transitory) for downloading targeted object recognition modules that are selected from a library of candidate targeted object recognition modules (e.g., hosted in the cloud) based on various signals, such as a task to be performed by a robot. Each targeted object recognition module may facilitate inference of information about of an observed-but-not-yet-classified object in the robot's environment, such as an object type (e.g., "cup," "plate," "telephone," etc.) and/or pose (e.g., orientation, location, etc.). In some implementations, an object recognition client may be operated on the robot or on a computing system (e.g., a desktop computer, router, etc.) that is considered "local" to the robot (e.g., in the same building, at least partially controls robot operation, etc.). When the robot is assigned a task, the object recognition client may download one or more targeted object recognition modules that are selected (e.g., by the object recognition client or by another component) from the library based on various signals, such as a task to be performed by the robot. That way, the object recognition client can dedicate limited computing resources to recognizing/classifying objects the robot is likely to encounter while performing the task, and resources are not wasted attempting to recognize/determine object types/poses of objects that are not likely to be encountered.

Suppose a robot is instructed to clear a kitchen table. When performing such a task, the robot is likely to encounter objects typically found in kitchens, such as dishware, cups, silverware, napkins, cutlery, and so forth. The robot is less likely to encounter non-kitchen-related objects such as power tools, cleaning supplies, electronics, etc. Accordingly, one or more targeted object recognition modules that facilitate inference of an object type and/or pose of kitchen-related objects may be selected, e.g., by the object recognition client or by one or more cloud-based processes, from the library of candidate targeted object recognition modules. The selected modules may be downloaded to the object recognition client. Based on the downloaded targeted object recognition modules and vision data obtained by one or more vision sensors, the object recognition client may determine object types and/or poses of one or more objects on the kitchen table.

Targeted object recognition modules may take various forms. In some implementations, the targeted object recognition modules may take the form of object models (e.g., CAD-based) that the object recognition client may use to determine information about observed objects, such as object types and/or poses, e.g., using vision and/or depth data obtained by one or more vision sensors. In other implementations, the targeted object recognition modules may take the form of two-dimensional ("2D") patterns or profiles of objects that may be matched to portions of 2D image data (e.g., video frames) captured by one or more vision sensors. In yet other implementations, the targeted object recognition modules may include routines (e.g., state machines) that may be implemented/triggered by the object recognition client to infer object types and/or poses.

As noted above, the downloaded targeted object recognition modules may be selected from the library locally, e.g., by the object recognition client, or they may be selected remotely, e.g., by what will be referred to herein as a "root object recognition server" operated by one or more processors forming part of the cloud. In the latter case, the object recognition client may provide, to the root object recognition server, various signals, such as attributes of a task to be performed by the robot, data indicative of one or more observed objects, data available resources of the robot, etc. The root object recognition server may then select one or more targeted object recognition modules based on the one or more signals.

Targeted object recognition modules may be selected from the library based on attributes of a task to be performed by a robot and/or based on other signals. For example, in some implementations, targeted object recognition modules may be selected from the library based on resources available to the object recognition client. If the object recognition client is implemented on the robot, and the robot is low on battery power, then a relatively small number of targeted object recognition modules may be downloaded. In some implementations, one or more attributes of a data (e.g., wireless) connection between the object recognition client and the cloud may be considered—e.g., the less reliable and/or lower bandwidth of the connection, the fewer modules downloaded. Additionally or alternatively, if an assigned task will take a robot to an area that has an unreliable and/or low-bandwidth data connection, targeted object recognition modules may be downloaded to the robot before it departs, and/or the robot may wait until targeted object recognition modules are downloaded before entering the area with the unreliable connection.

In some implementations, a task performance history of the robot may be considered when selecting targeted object recognition modules from the library. If the robot has historically only been operated to perform a select few types of tasks, then targeted object recognition modules associated with objects that have been historically encountered by the robot when performing those tasks may be favored. In other words, the object recognition client and/or root object recognition server may learn over time which objects are expected to be encountered while performing particular tasks, and may favor targeted object recognition modules associated with the expected objects when a robot is performing the same or similar tasks. In some implementations, vision data captured of the environment in which the robot operates may be considered. For example, captured vision data may be analyzed by the object recognition client to determine various "clues" about an observed object, such as its approximate size. Targeted object recognition modules that target objects of that size may then be favored.

In some implementations, the object recognition client may apply multiple downloaded targeted object recognition modules to a single unclassified object detected in vision data captured by one or more sensors. Each targeted object recognition module may provide a competing object classification. For example, one targeted object recognition module may provide a classification of "cup," and another targeted object recognition module may provide a classification of "bowl." The object recognition client may select from the multiple competing classifications based on a variety of signals, such as a confidence measure associated with each classification, a time required to obtain each classification (longer processing times may indicate less certainty), a comparison of multiple classifications, and so forth.

In some implementations, a computer implemented method may be provided that includes the steps of: operating, by one or more processors, an object recognition client to facilitate object recognition for a robot; downloading, by the object recognition client, from a remote computing system, one or more targeted object recognition modules, wherein each targeted object recognition module facilitates inference of an object type or pose of an observed object, and wherein the one or more targeted object modules are selected from a library of targeted object recognition modules based on a task to be performed by the robot; obtaining, by the object recognition client, from one or more vision sensors, vision data capturing at least a portion of an environment in which the robot operates; and determining, by the object recognition client, based on the vision data and the one or more downloaded object recognition modules, information about an observed object in the environment.

This method and other implementations of technology disclosed herein may each optionally include one or more of the following features.

In various implementations, the one or more targeted object modules may be selected from the library based at least in part on one or more expected objects or object types associated with the task assigned to the robot. In various implementations, the expected objects or object types may be determined based on objects encountered by one or more robots historically when performing tasks sharing one or more attributes with the task to be performed by the robot. In various implementations, the one or more targeted object recognition modules may be selected from the library based at least in part on available resources of the robot. In various implementations, the available resources of the robot may include one or more attributes of a wireless signal available to the robot. In various implementations, the one or more targeted object recognition modules may be selected from the library based at least in part on the vision data.

In various implementations, the one or more targeted object recognition modules may be selected from the library by the object recognition client. In various implementations, the one or more targeted object recognition modules may be selected from the library by the remote computing system based on one or more attributes of the task provided to the remote computing system by the object recognition client.

In various implementations, the one or more vision sensors may include a camera configured to obtain depth data, and the vision data comprises a point cloud associated with the environment. In various implementations, the one or more vision sensors may be integral with the robot.

In various implementations, the method may further include selecting, by the object recognition client, from multiple competing inferences of object types or poses provided by multiple downloaded targeted object recognition modules, a given inference of an object type or pose based on a measure of confidence associated with the given inference. In various implementations, the one or more processors may be integral with the robot. In various implementations, the one or more processors may be integral with a computing device that is in wireless communication with the robot.

In another aspect, a computer-implemented method may include the following operations: receiving, by a root object recognition server, from a remotely-operated object recognition client, data indicative of one or more observed objects, wherein the data indicative of one or more observed objects is based on vision data capturing at least a portion of an environment in which a robot operates; selecting, by the root object recognition server, one or more targeted object recognition modules from a library of targeted object recognition modules based at least in part on the data indicative of one or more observed objects, wherein each targeted object recognition module facilitates inference of an object type or pose of an observed object; and downloading, by the root object recognition server to the object recognition client, the selected one or more targeted object recognition modules.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
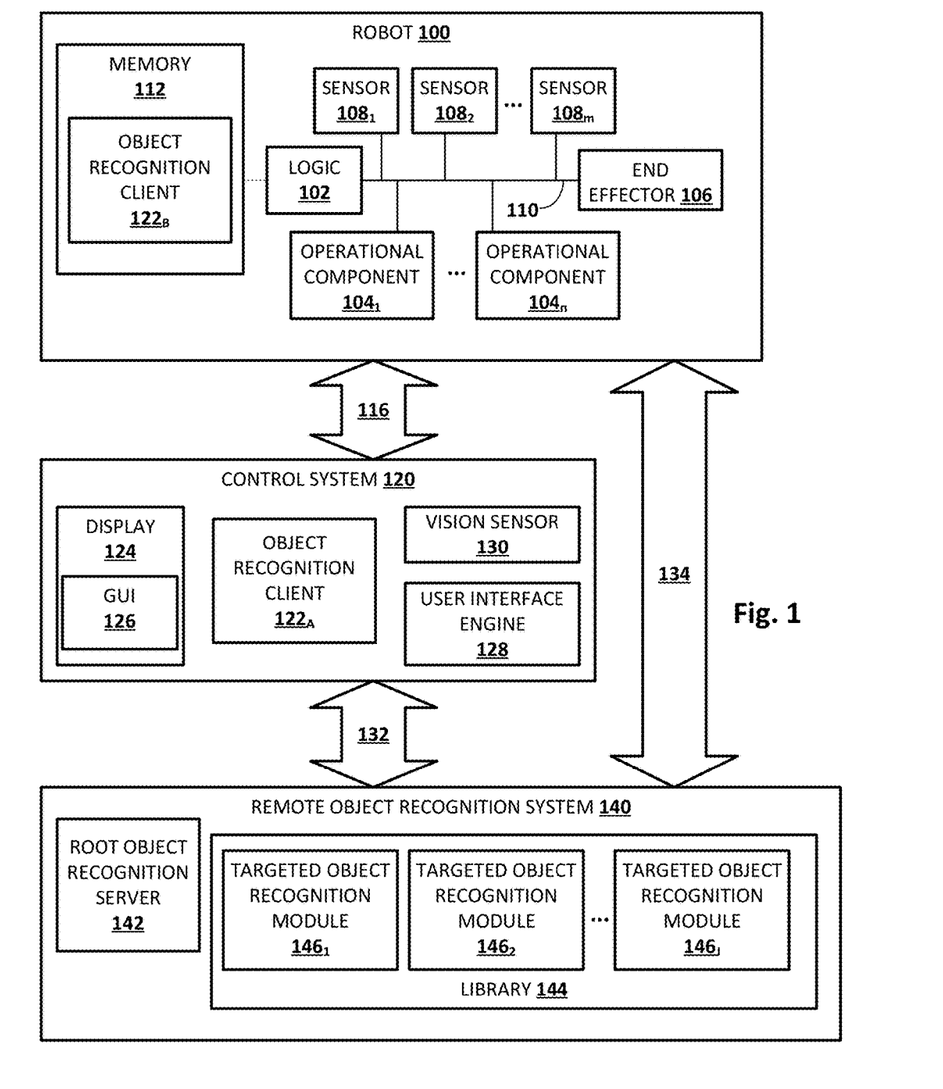
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be locally controlled in whole or in part by a control system 120. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. In various implementations, robot 100 may include logic 102. Logic 102 may take various forms, such as a real time controller, one or more processors, one or more fieldprogrammable gate arrays ("FPGA"), one or more application-specific integrated circuits ("ASIC"), and so forth. In some implementations, logic 102 may be operably coupled with memory 112. Memory 112 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, an "operational component" 104 of a robot may broadly refer to actuators, motors (e.g., servo motors), joints, shafts, gear trains, pumps (e.g., air or liquid), pistons, drives, or other components that may create and/or undergo propulsion, rotation, and/or motion. Some operational components 104 may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, sprayers (e.g., for paint, pesticide, cleaning solutions, or other fluids), containers, trays, and so forth. In some implementations, end effector 106 may be removable, and various types of modular end effectors may be installed onto robot 100, depending on the circumstances.

Sensors 108 may take various forms, including but not limited to three-dimensional ("3D") laser scanners or other 3D vision sensors (e.g., stereographic cameras used to perform stereo visual odometry) configured to provide depth measurements, 2D cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as standalone units or as part of control system 120.

Control system 120 may include one or more computing systems connected by one or more networks (not depicted) that control operation of robot 100 to various degrees. An example of such a computing system is depicted schematically in FIG. 5. In some implementations, control system 120 may be operated by a user (not depicted) to exert a relatively high level of control over robot 100, e.g., in real time in response to signals received by a user interface engine 128 and/or one or more readings from one or more sensors 108. In other implementations, control system 120 exerts less direct control over robot 100. For example, control system 120 may provide robot 100 with a high level task such as "go to kitchen, clear table, and load dishwasher." Logic 102 on robot 100 may convert such high level tasks into robot action, e.g., by translating one or more high level tasks into a plurality of motion primitives executable by robot 100. In some implementations, control system 120 may include a display 124 (e.g., CRT, LCD, touchscreen, etc.) on which a graphical user interface 126 operable to remotely control robot 100 may be rendered.

As noted above, control system 120 may be considered "local" to robot 100. For example, if robot 100 is deployed in a home, control system 120 may be implemented in or near the home on one or more home computers (desktop or laptop), tablet computers, smart phones, smart routers, home servers, smart watches, set top boxes, and so forth. Similarly, if robot 100 is deployed in a manufacturing and/or commercial setting, control system 120 may be implemented on one or more computing devices having one or more of the aforementioned form factors that is in or near the commercial setting. More generally, to be considered "local" to robot 100, a computing device may be in communication with robot 100 through one or more personal area networks ("PANs") and/or local area networks ("LANs"). Put another way, resources are considered "local" to robot 100 when they are available when robot 100 and/or control system 120 are "offline," e.g., not connected to the Internet. Of course, techniques described herein are not limited to control systems that are in communication with robot 100 using LANs or PANs. Assuming sufficient bandwidth and acceptable latency, techniques described herein may be implemented using a control system 120 that is in communication with robot 100 over one or more wide area networks ("WAN") such as the Internet.

Control system 120 and robot 100 may communicate via one or more communication channels 116. Communication channels 116 may utilize various wired and/or wired communication technologies typically utilized over short to medium ranges, e.g., in PANs and/or LANs. For example, in some implementations, communication channel 116 may include one or more PANs employing technologies such as Bluetooth, Wireless universal serial bus ("USB"), Z-Wave, Zigbee, Infrared Data Association ("IrDA"), INSTEON, and so forth. Additionally or alternatively, in some implementations, communication channel 116 may employ one or more technologies typically associated with LANs, such as Wi-Fi (IEEE 802.11), Ethernet (IEEE 802.3), and so forth.

Various modules or engines may be implemented as part of control system 120 as software, hardware, or any combination of the two. For example, in FIG. 1, control system 120 includes an object recognition client $122_A$, the aforementioned display 124 and user interface engine 128, and a vision sensor 130. Vision sensor 130 may take various forms, such as a 3D laser scanner or other 3D vision sensor (e.g., stereographic camera used to perform stereo visual odometry) configured to provide depth measurements, a 2D camera, and so forth.

While robot 100 and control system 120 are depicted separately in FIG. 1, this is not meant to be limiting. In various implementations, one or more aspects (e.g., modules, engines, etc.) depicted in FIG. 1 as implemented on one of robot 100 or control system 120 may be implemented on the other, may be distributed across both, and/or may be distributed across one or both in combination with other components not depicted in FIG. 1. For example, robot 100 may operate another instance of object recognition client $122_B$ in memory 112, which may compliment, supplement, or may even replace the first instance of object recognition client $122_A$ that operates on control system 120. In some implementations, control system 120 may be implemented entirely or in part using logic 102 of robot 100.

Remote object recognition system 140 may include one or more computing systems connected by one or more networks (not depicted, sometimes referred to as a "cloud") that facilitate object recognition by one or more robots, including robot 100, and/or by one or more control systems 120 that are used to control the robots. An example of such a computing system is depicted schematically in FIG. 5. Robot 100 and/or control system 120 may be in communication with remote object recognition system 140, e.g., over connection 132 and/or 134. Connections 132 and/or 134 may be implemented using any wired or wireless technologies typically associated with WAN communication, such as through one or more connected LANs, cellular (e.g., 3G, 4G and beyond), T1, Ethernet, DSL, and so forth, though this is not meant to be limiting. In other implementations, connections 132 and/or 134 may be implemented using LAN or PAN technology.

Various modules or engines may be implemented as part of remote object recognition system 140 as software, hardware, or any combination of the two. For example, in FIG. 1, remote object recognition system 140 includes a root object recognition server 142 and a library 144 of targeted object recognition modules $146_{1-J}$. Library 144 may come in the form of one or more databases or other similar data structures suitable for storing targeted object recognition modules 146. Root object recognition server 142 may have access to library 144 and, as will be discussed in more detail below, may be configured to select one or more targeted object recognition modules 146 to process data indicative of an object observed in an environment in which robot 100 operates, and to provide (e.g., download to) control system 120 and/or robot 100 with the selected one or more targeted object recognition modules 146. In some implementations, root object recognition server 142 may be operated in whole or in part on robot 100 and/or control system 120.

Targeted object recognition modules $146_{1-J}$ may take various forms. In some implementations, targeted object recognition modules 146 may include object models (e.g., computer-aided design, or "CAD", based) that may be used and/or triggered to provide inferences about object types/poses, e.g., using vision and/or depth data obtained by one or more vision sensors (e.g., 108, 130). In other implementations, targeted object recognition modules $146_{1-J}$ may take the form of 2D patterns or profiles of objects that may be matched to portions of 2D image data (e.g., video frames) captured by one or more vision sensors (e.g., 108, 130). In yet other implementations, targeted object recognition modules $146_{1-J}$ may include routines (e.g., state machines) that may be implemented/triggered by object recognition client 122 (122A or 122B) to provide inferences about object type and/or pose.

Object recognition client 122 (hereinafter, any operation described as performed by object recognition client 122 may be performed by 122A and/or 122B) may be configured to obtain, from one or more vision sensors (e.g., 108 or 130), vision data capturing at least a portion of an environment in which robot 100 operates. The sensor data may reveal one or more observed objects in the environment with object types and poses that may be unknown.

In various implementations, object recognition client 122 may be configured to download, from remote object recognition system 140, one or more targeted object recognition modules 146 that will be used/applied to make one or more inferences about the one or more observed object. In various implementations, each downloaded targeted object recognition module 146 may facilitate determination of an object type and/or pose by the object recognition client 122. The one or more downloaded targeted object modules may be selected, e.g., by root object recognition server 142 and/or object recognition client 122, from library 144 of targeted object recognition modules 146 based on various signals.

For example, in some implementations, targeted object recognition modules 146 may be selected, e.g., by root object recognition server 142 and/or object recognition client 122, for download to object recognition client 122 based on data indicative of one or more observed objects. In some implementations, the data indicative of the one or more observed objects may include at least a subset of the sensor data. For example, in some implementations, one or more sensors 108 and/or vision sensor 130 may provide a so-called "point cloud" that includes, for instance, a color value and depth for each observed point. Object recognition client 122 may provide all or a selected subset of the point cloud to root object recognition server 142. The same may be true for 2D sensor data.

In other implementations, the data indicative of the observed one or more objects may include a so-called "soft classifier." For example, object recognition client 122 may include functionality to approximately classify an object's type and/or pose using its limited resources, e.g., with a relatively low level of confidence. In some implementations, object recognition client 122 may calculate a soft classifier for an observed object based on data other than observed attributes of the object, such as a location of the object and/or robot 100. For instance, object recognition client 122 may be more likely to guess that an observed object is a tool if the object is located in a garage. A robot's location may be determined in various ways, such as using global position system ("GPS") coordinates, inertial measurement units ("IMU"), or various triangulation techniques that leverage one or more wireless connections of robot 100. Based on the soft classifier, root object recognition server 142 and/or object recognition client 122 may select one or more targeted object recognition modules 146 from library 144.

In some implementations, object recognition client 122 may provide root object recognition server 142 with multiple soft-classifiers for a particular observed object (e.g., multiple object types or poses that the object could potentially match), and root object recognition server 142 may select multiple targeted object recognition modules 146 that correspond to the multiple soft-classifiers. In some implementations, object recognition client 122 may provide root object recognition server 142 with other "clues" in addition to or instead of soft-classifiers. For example, object recognition client 122 may provide root object recognition server 142 with a location of the observed object or robot 100 (which may be determined as described above). If root object recognition server 142 determines from the received location data that robot 100 or the observed object is in a garage, root object recognition server 142 may be more likely to select targeted object recognition modules 146 that are configured to provide inferences about types and/or poses of tools. If root object recognition server 142 determines from the received location data that robot 100 or the observed object is in a kitchen, root object recognition server 142 may be more likely to select targeted object recognition modules 146 that are configured to provide inferences about types and/or poses of items typically found in kitchens, such as cutlery, dishware, etc.

Additionally or alternatively, in various implementations, object recognition client 122 may provide information about a task to be performed by robot 100 to root object recognition server 142. Based on this task information, root object recognition server 142 may select one or more targeted object recognition modules 146 for download to object recognition client 122. Suppose a task to be performed by robot 100 is "Go to kitchen, clear table, and load dishwasher." Upon learning of this task, root object recognition server 142 may select targeted object recognition modules 146 that are geared towards identification of object types and/or poses of objects that are expected to be encountered in a kitchen, such as dishware, cutlery, etc.

Each targeted object recognition module 146 that is selected by root object recognition server 142 (and/or by object recognition client 122) may be used and/or applied to process the data indicative of the observed object(s) in the environment of robot 100 in various ways. As was noted above, in some implementations, each downloaded targeted object recognition module 146 may be a self-contained state machine that can be triggered, provided with input and then can provide output (e.g., an inference about a pose and/or object type of an observed object).

In some implementations, each targeted object recognition module 146 may include an object model associated with a particular object type and/or pose about which the module is configured to provide one or more inferences. Such targeted object recognition modules may be self-contained state machines, or may simply be models that are utilized by other processes (e.g., object recognition client 122) that provide inferences based on the models and data indicative of observed objects provided by object recognition client 122.

However targeted object recognition modules 146 are used to process the data indicative of the observed object(s), object recognition client 122 may determine, e.g., from output of one or more of the plurality of targeted object recognition modules 146, one or more inferences about an object type or pose of the observed object(s). Based on the one or more inferences, object recognition client 122 may determine an object type or pose of the observed object.

In some implementations, root object recognition server 142 and/or object recognition client 122 may learn over time which targeted object recognition modules 146 are most likely to be useful to robot 100. For example, the first time robot 100 performs a particular task in a particular area, a relatively large number of targeted object recognition modules 146 may be selected by root object recognition server 142 and downloaded to robot 100, e.g., so that robot 100 has a relatively good chance of identifying any objects it encounters. But as robot 100 performs the same task (or similar tasks) over time in the same or similar area, robot 100 may tend to encounter the same types of objects repeatedly. Accordingly, targeted object recognition modules 146 associated with repeatedly-encountered objects may be favored over targeted object recognition modules 146 associated with less-often-encountered objects. For example, object recognition client 122 may track how many times a particular targeted object recognition module 146 is used to determine an observed object's type or pose. This tracking information may be made available to root object recognition server 142, so that in the future, root object recognition server 142 may more intelligently select targeted object recognition modules 146 from library 144. Additionally or alternatively, object recognition client 122 may use this tracking information to request, e.g., from root object recognition server 142, specific targeted object recognition modules 146.

Figure 2:
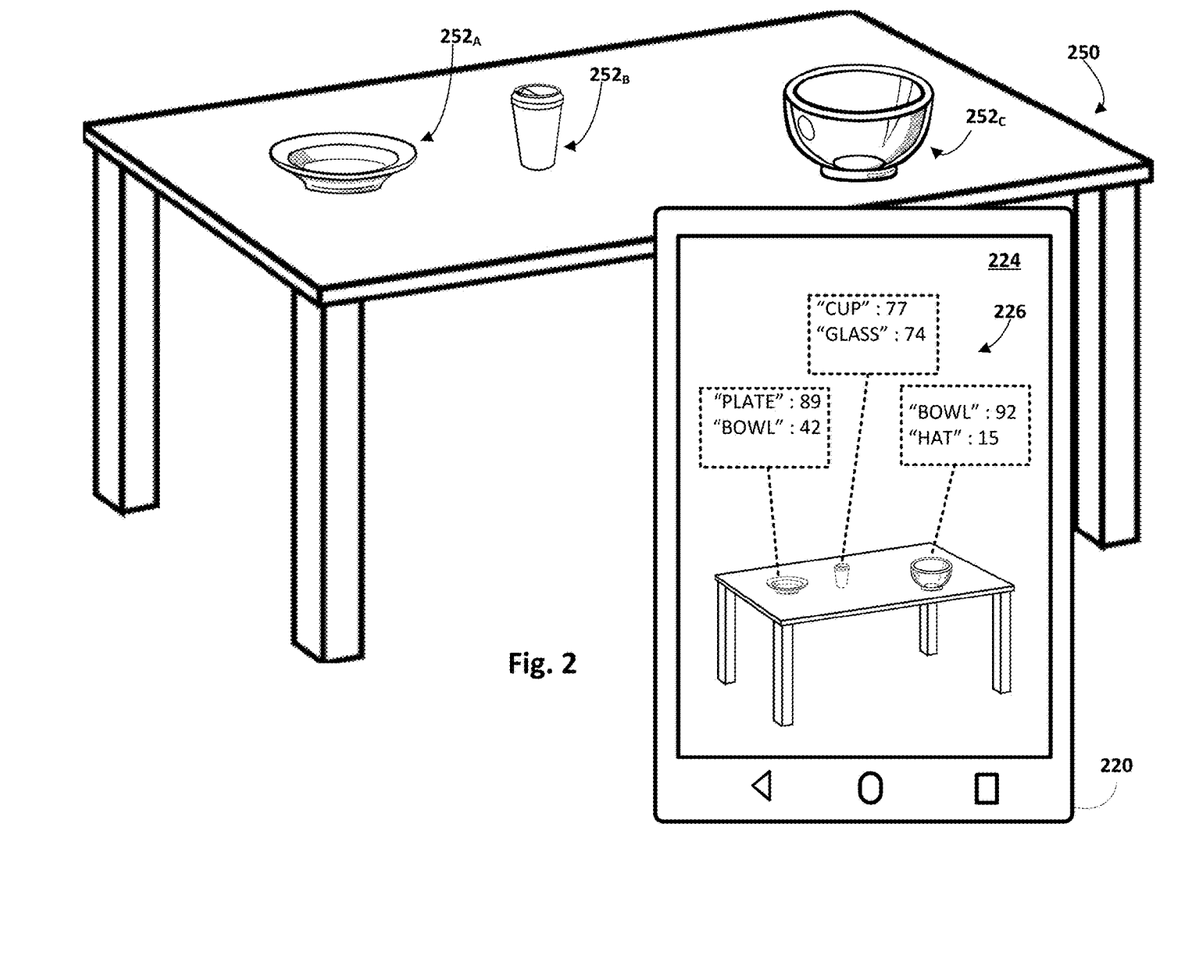
FIG. 2 depicts an example of how disclosed techniques may be practiced, in accordance with various implementations.

FIG. 2 depicts an example scenario in which an environment in which a robot (not depicted) operates includes a table 250 with three objects $252_{A-C}$ on top. The environment appears to be a kitchen or dining area based on the fact that the three objects $252_{A-C}$ take the form of a plate, a cup, and a bowl. In this example, a user (not depicted) controls the robot using a control system 220 in the form of a tablet computer. Control system 220 includes a display 224 in the form of a touchscreen, and at least a front-facing camera (not visible) that is currently capturing in its field of view table 250 and objects $252_{A-C}$. A graphical user interface 226 is rendered on display 224 that depicts the field of view of the camera, and hence depicts table 250 and objects $252_{A-C}$.

Using techniques described herein, control system 220, e.g., by way of an object recognition client (not depicted in FIG. 2, see 122A in FIG. 1) executing thereon, has downloaded and obtained inferences from a plurality of targeted object recognition modules ($146_{1-J}$ in FIG. 1) about object types of objects $252_{A-C}$. These inferences are displayed as part of graphical user interface 226. For example, first object $252_A$ has been inferred to be either a plate or a bowl. These inferences are accompanied by confidence measures that indicate how confident the respective targeted object recognition module 146 is about its inference. For example, one targeted object recognition module 146 configured to identify plates has identified first object $252_A$ as a plate with a confidence measure of 89 (out of 100). Another targeted object recognition module 146 configured to identify bowls has identified first object $252_A$ as a bowl with a much lower confidence measure of 42. Based on these confidence measures, object recognition client 122A (or in some scenarios, root object recognition server 142) may determine that first object $252_A$ is most likely a plate.

While confidence measures depicted in FIG. 2 are within the range of 0-100, this is not meant to be limiting. Confidence measures may fall within various types of ranges, such as 0-1, or any other range. And while the inferences and respective confidence measures are visibly rendered on display 224, this is not required. In many cases, these inferences and confidence measures may be used "under the hood" by object recognition client 122 (122A on control system 120/220 or 122B on robot 100) and/or root object recognition server 142 to determine object types/poses, without displaying anything to a user. Graphical user interface 226 of FIG. 2 may be used, for instance, to debug robot operation and/or to demonstrate to a user how objects are being classified, and is being used here to demonstrate disclosed techniques.

Second object $252_B$ in FIG. 2 has been alternately inferred to be a cup (with a confidence measure of 77) and a glass (with a confidence measure of 74). In some implementations, because the confidence value associated with the inference of cup is slightly greater than the confidence value associated with the inference of glass, object recognition client 122 may simply determine that second object $252_B$ is a cup. However, because the confidence measures are so close, in some implementations, object recognition client 122 may take additional actions to attempt to disambiguate between the two conflicting inferences.

For example, in some implementations, additional information may be obtained from one or more sensors 108 to attempt to obtain a more accurate inference about second object $252_B$. In other implementations, other signals or "clues" may be used to disambiguate between conflicting inferences. For example, object recognition client 122 may take into account the time of day (e.g., morning) to determine that second object $252_B$ is more likely a paper coffee cup than a glass. In other implementations, object recognition client 122 may consult with an object inventory associated with an operator of a robot to determine that the operator does not own a glass matching the "glass" inference, and therefore the "cup" inference must be correct.

In yet other implementations, canonical models associated with each inference, such as computer aided designs ("CAD") associated with cups and glasses, may be used to render one or more canonical cups and glasses. In some instances these canonical objects may be rendered in poses inferred by targeted object recognition modules 146 (e.g., in addition to inferred object types). Sensor data depicting second object 252B (e.g., 2D camera data) may then be compared with each rendered canonical model to detect a closest match. The closest match may be used to resolve the conflict between the cup and glass inferences. In some implementations, shapes of the canonical models may be used to disambiguate between multiple conflicting inferences. In some implementations, other characteristics of the canonical models, such as colors, opaqueness, transparency, reflectiveness, etc., may be used to disambiguate between multiple conflicting inferences. For example, a canonical model of a paper coffee cup may indicate that the cup is opaque and/or has a flat (i.e. "matte"), non-reflective surface. By contrast, a canonical model of a glass may indicate that the glass is transparent and/or has a reflective surface.

Third object $252_C$ in FIG. 2 has been alternately inferred to be a bowl (with a confidence measure of 92) and a hat (with a confidence measure of 15). While not depicted in FIG. 2, the "hat" inference may be coupled with an inference about its pose, such as that the hat is upside down. In some implementations, because the confidence value associated with the inference of "bowl" is much greater than the confidence value associated with the inference of "hat," object recognition client 122 may simply determine that third object $252_C$ is a bowl.

Figure 3:
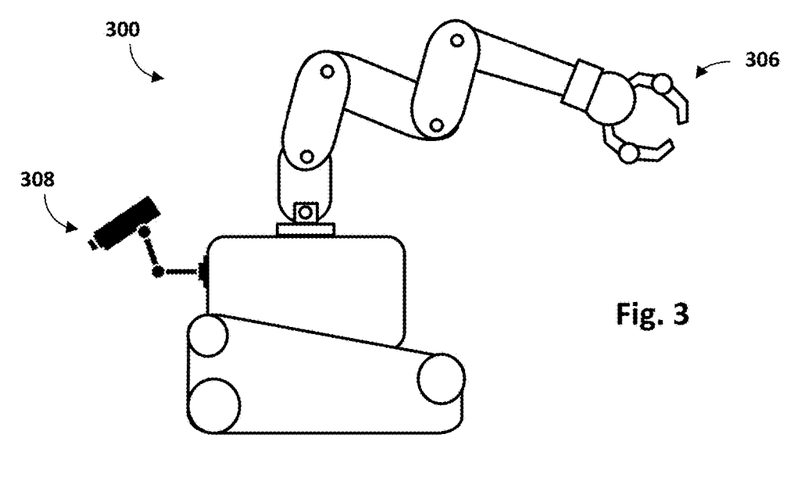
FIG. 3 depicts another example of how disclosed techniques may be practiced, in accordance with various implementations.

FIG. 3 demonstrates example scenarios in which root object recognition server 142 (or object recognition client 122) may select one or more targeted object recognition modules 146 from library 144 based on various signals. A robot 300 is depicted in the form of a mobile robot arm with a "claw" style end effector 306 and an onboard vision sensor 308. Suppose a user operates control system 120 (e.g., her smartphone or tablet computer, not depicted in FIG. 3) to instruct robot 300 to go into the kitchen 360 and perform some kitchen-related task (e.g., empty dishwasher, clean floor, etc.). In some implementations, data indicative of this task may be provided to root object recognition server 142. Root object recognition server 142 may in turn select one or more targeted object recognition modules 146 that facilitate inference of object types or poses of objects likely to be encountered in kitchen 360, and may download the selected targeted object recognition modules 146 to robot 300 and/or to the undepicted control system (120 in FIG. 1). Object recognition client 122 may then utilize these downloaded targeted object recognition modules 146 to determine object types and/or poses associated with one or more observed objects in kitchen 360.

A wireless access point 362 is depicted in kitchen 360. Wireless access point 362 may provide a strong, reliable signal within kitchen 360. However, wireless access point 362 may not provide as strong or reliable a signal in other areas, such as on an outdoor porch 364. Suppose the user instructs robot 300 to go to porch 364 and perform some porch-related task (e.g., water flowers, waterproof porch, etc.). Suppose further that, for this example at least, object recognition client 122 operates on robot 300 (e.g., 122B in FIG. 1). Object recognition client 122B may determine, e.g., based on past instances in which robot 300 was operated on porch 364, that the wireless signal on porch 364 is weak and/or unreliable. Accordingly, prior to robot 300 travelling to porch 364 to perform its task (e.g., while robot 300 travels through kitchen 360 towards porch 364), object recognition client 122B may notify root object recognition server 142 of the task and/or the location of the task. As discussed above, root object recognition server 142 may select and download to object recognition client 122B one or more targeted object recognition modules 146. Object recognition client 122B may then use these downloaded modules to determine object types and/or poses of objects encountered by robot 300 on porch 364.

In some instances, the targeted object recognition modules 146 will be downloaded to robot 300 while robot 300 travels through kitchen 360 to porch 364, e.g., while robot 300 is in range of wireless access point 362. However, robot 300 may reach the door between kitchen 360 and porch 364 (and hence, become potentially out-of-range of wireless access point 362) before the selected targeted object recognition modules 146 are downloaded to robot 300. In some implementations, robot 300 may pause while still in range of wireless access point 362 until robot 300 is able to fully download targeted objects recognition modules 146 it will need on porch 364.

Figure 4:
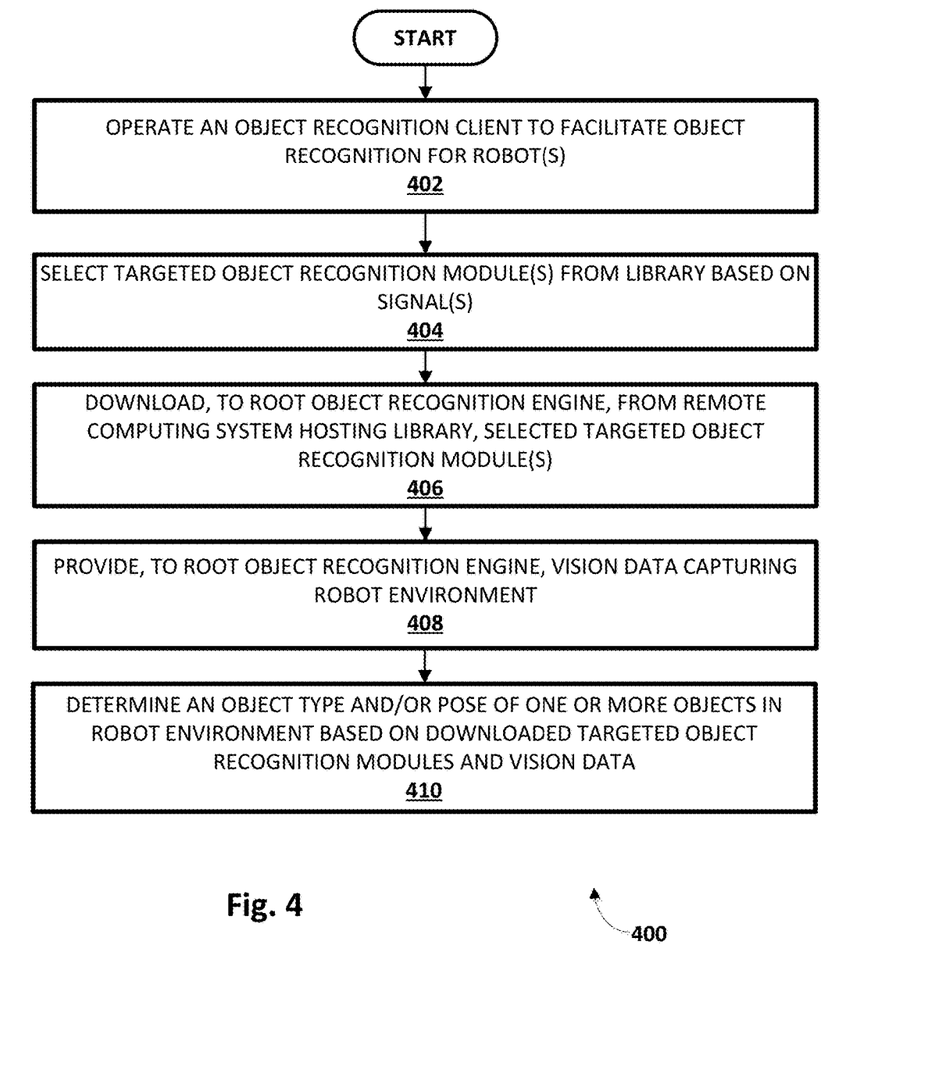
FIG. 4 depicts an example method in accordance with various implementations.

Referring now to FIG. 4, an example method 400 of downloading targeted object recognition modules that are selected from a library of candidate targeted object recognition modules based on various signals is described. For convenience, the operations of the flowchart are described with reference to a system that performs the operations. This system may include various components of various computer systems. For instance, some operations may be performed at robot 100, while other operations may be performed by one or more components of control system 120 and/or remote object recognition system 140. Moreover, while operations of method 400 are shown in a particular order, this is not meant to be limiting. One or more operations may be reordered, omitted or added.

At block 402, the system may operate an object recognition client, e.g., on robot 100 (e.g., 122B), on a local control system 120 (e.g., 122A), or elsewhere, to perform and/or otherwise facilitate object recognition for one or more robots. At block 404, the system (e.g., root object recognition server 142 or object recognition client 122) may select one or more targeted object recognition modules (146) from a library (e.g., 144) of object recognition modules based on various signals. As described above, in some implementations, these signals may include a task assigned to the robot. For example, if the robot is instructed to clean a child's room, then targeted object recognition modules associated with objects likely to be found in a child's room, such as toys, may be selected. If the robot is instructed to play a board game, then targeted object recognition modules associated with game pieces used in that board game may be selected.

Other signals may be used as well. For example, one or more available resources of the robot may be considered. In some implementations, object recognition client 122 may notify root object recognition server 142 of its limited resources. For example, object recognition client 122 may explicitly state in its request for targeted object recognition modules that robot 100 has limited resources. Additionally or alternatively, object recognition client 122 may implicitly indicate limited resources by, for instance, requesting that root object recognition server 142 limit the number of targeted object recognition modules it selects and downloads to object recognition client 122.

One resource available to a robot is a wireless signal available to the robot, e.g., such as Wi-Fi signal, a cellular signal, a Bluetooth signal, and so forth. Suppose a robot is operating in an area with a weak or unreliable signal, or a signal with limited bandwidth. Before such a robot performs a task, it may notify root object recognition server 142 of the suboptimal wireless signal. Root object recognition server 142 may take this into account when selecting targeted object recognition modules 146 to download to the robot. In some implementations, root object recognition server 142 may be more particular when selecting targeted object recognition modules to download to a robot with a low-bandwidth connection. For example, under normal circumstances (e.g., a strong wireless signal with ample bandwidth), root object recognition server 142 may select and download to the robot a relatively large number of targeted object recognition modules associated with various types objects, some associated with objects of which there may only be a slight chance the robot will encounter while performing a task. However, when the robot has a low-bandwidth connection, root object recognition server 142 may only select a smaller set of targeted object recognition modules to download to the robot, such as the n modules associated with objects that the robot is most likely to encounter. In various implementations, the number of selected modules n may be set by a user and/or determined dynamically, e.g., based on bandwidth available to the robot.

Other available resources of the robot may be considered as well when selecting targeted object recognition modules, in addition to or instead of attributes of a wireless signal available to the robot. Suppose a robot has limited processing power. Providing an object recognition client 122B operating on the robot with too many targeted object recognition modules 146 may overburden the robot's processing capabilities, causing the robot to stall or behave sluggishly. Accordingly, in some implementations, root object recognition server 142 may be more discerning when selecting targeted object recognition modules to download to a robot with limited processing power. For example, and similar to above, root object recognition server 142 may only select a relatively small set of targeted object recognition modules to download to the robot, such as the n modules associated with objects that the robot is most likely to encounter. Root object recognition server 142 may be similarly discerning when selected targeted object recognition modules to download to a robot having limited battery power.

Other signals or "clues" may be considered as well when selecting targeted object recognition modules to download to object recognition client 122 at block 404. For example, and as was mentioned above, data indicative of one or more unclassified observed objects in the environment may be provided to root object recognition server 142, which may in turn use this data to select targeted object recognition modules. As was noted above, this data indicative of the one or more unclassified observed objects may include, for instance, at least a subset of vision data obtained by one or more sensors (in which case operations of block 408 described below may be performed prior to or concurrently with operations of block 404), one or more soft classifiers, one or more other signals, or "clues," about objects likely to be encountered by the robot when performing its task, and so forth.

Referring back to FIG. 4, at block 406, the system may download to the object recognition client 122 (which may operate on the robot or on a local control system used to control the robot) the targeted object recognition modules selected at block 404. In some implementations, the downloaded targeted object recognition modules may take the form of low level machine instructions compiled to execute on a specific computing architecture of the robot or control system. In some implementations, the downloaded targeted object recognition modules may take the form of higher-level instructions that can be, for instance, interpreted by object recognition client 122 to determine object types or poses. For example, in some implementations, the downloaded targeted object recognition modules may be constructed using markup languages such as the extensible markup language ("XML") or the Unified Modeling Language ("UML") to convey a state machine, and object recognition client 122 may implement these state machines.

In some implementations, the downloaded targeted object recognition modules may take the form of a CAD model, 2D model, and/or associated annotations, which may be compared by object recognition client 122 to sensor data indicative of observed objects in the environment. In some implementations, the downloaded targeted object recognition modules may take the form of machine learning classifiers that are trained to label object types and/or poses of particular objects.

At block 408, the system may provide, e.g., to object recognition client 122, vision data capturing the robot environment. For example, a 3D vision sensor mounted on the robot or nearby may obtain a point cloud of data. This point cloud (or a subset thereof) may be provided to object recognition client 122. As another example, one or more 2D images may be captured of the environment and provided to object recognition client 122.

Based on the vision data, at block 410, the system may utilize the one or more targeted object recognition modules downloaded at block 406 to determine information about one or more observed objects in the environment, such as an object type and/or pose. For example, a targeted object recognition module configured to identify cups may receive, as input, point cloud data obtained at block 408, and provide, as output, an inference that an observed object is a cup and/or a current pose of the cup (e.g., orientation, right-side up, upside down, on its side, full of fluid, cap attached, etc.). In some instances, the targeted object recognition module may also output a measure of confidence associated with its inference, as was discussed previously with regard to FIG. 2. Based on one or more object type/pose inferences obtained using downloaded targeted object recognition modules, the system may determine information about one or more observed objects in the environment, such as an object type and/or pose.

Figure 5:
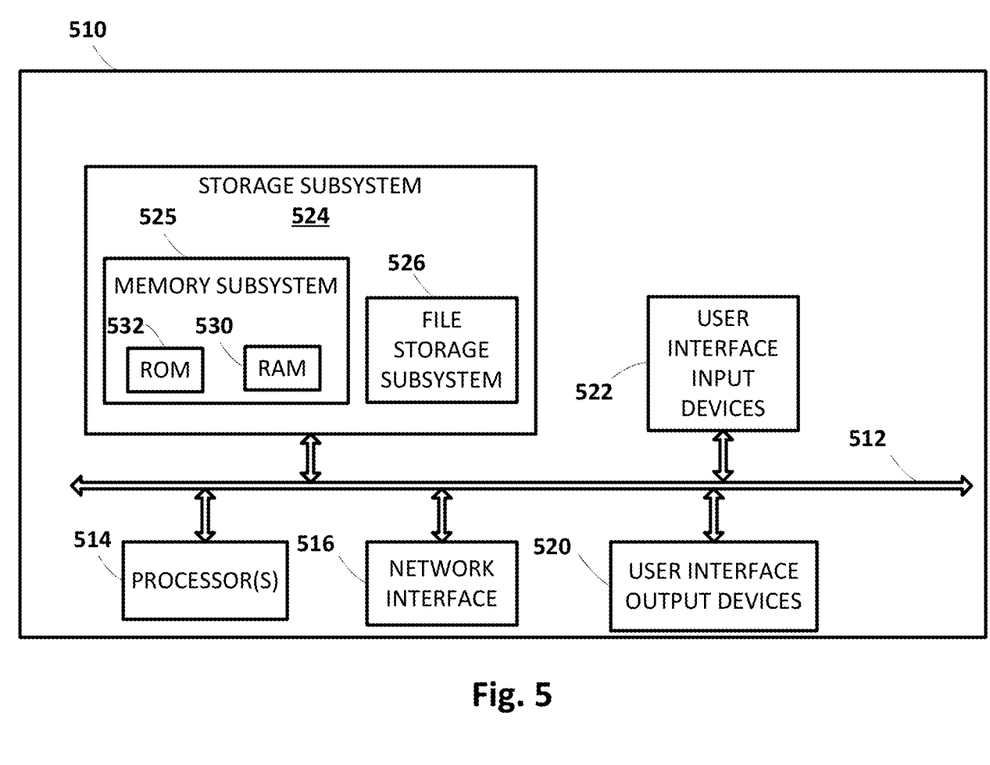
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100, control system 120, or remote object recognition system 140. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method comprising:

operating, by one or more processors integral with a robot, an object recognition client to facilitate object recognition for the robot;

determining an assigned task to be performed by the robot;

determining a range of a wireless access point through which the robot is able to engage in wireless network communication with a remote computing system;

determining that the assigned task requires the robot to travel to an area that is outside of the range of the wireless access point, such that the robot will be unable to engage in wireless network communication with the remote computing system while in the area;

based on the assigned task, and while the robot is within the range of the wireless access point, downloading, to the robot by the object recognition client, from the remote computing system, one or more targeted object recognition modules, wherein each targeted object recognition module is usable by the object recognition client to calculate, at the robot, an object type or pose of an observed object, and wherein the one or more targeted object recognition modules are selected from a library of targeted object recognition modules that is remote from the robot based on the assigned task;

determining that the downloading is complete;

after determining that the downloading is complete, operating the robot to travel outside of the range of the wireless access point into the area;

obtaining, by the object recognition client, from one or more vision sensors integral with the robot, vision data capturing, from a perspective of the robot, at least a portion of the second area;

determining, at the robot by the object recognition client, based on the vision data and the one or more downloaded object recognition modules, information about an object in the second area that is detected in the vision data captured by the one or more vision sensors integral with the robot; and operating the robot to perform the assigned task.

2. The computer-implemented method of claim 1, wherein the one or more targeted object modules are selected from the library based at least in part on one or more expected objects or object types associated with the assigned task assigned to the robot.

3. The computer-implemented method of claim 2, wherein the expected objects or object types are determined based on objects encountered by one or more robots historically when performing tasks sharing one or more attributes with the assigned task.

4. The computer-implemented method of claim 1, wherein the one or more targeted object recognition modules are selected from the library based at least in part on available resources of the robot.

5. The computer-implemented method of claim 1, wherein the one or more targeted object recognition modules are selected from the library based at least in part on the vision data.

6. The computer-implemented method of claim 1, further comprising selecting, by the object recognition client, the one or more targeted object recognition modules from the library.

7. The computer-implemented method of claim 1, wherein the one or more targeted object recognition modules are selected from the library by the remote computing system based on one or more attributes of the assigned task provided to the remote computing system by the object recognition client.

8. The computer-implemented method of claim 1, wherein the one or more vision sensors includes a camera configured to obtain depth data, and the vision data comprises a point cloud associated with the environment.

9. The computer-implemented method of claim 1, further comprising selecting, by the object recognition client, from multiple competing inferences of object types or poses provided by multiple downloaded targeted object recognition modules, a given inference of an object type or pose based on a measure of confidence associated with the given inference.

10. A system comprising one or more processors integral with the robot and memory storing instructions that, in response to execution of the instructions by the one or more processors, cause the one or more processors to:
operate an object recognition client at a robot to perform object recognition for the robot, wherein the object recognition client is configured to:
determine an assigned task to be performed by the robot;
determine a range of a wireless access point through which the robot is able to engage in wireless network communication with a remote computing system;
determine that the assigned task requires the robot to travel to an area that is outside of the range of the wireless access point, such that the robot will be unable to engage in wireless network communication with the remote computing system while in the area;
based on the assigned task, and while the robot is within the range of the wireless access point, download, to the robot from the remote computing system, one or more targeted object recognition modules, wherein each targeted object recognition module is usable by the object recognition client to calculate, at the robot, an object type or pose of an observed object, and wherein the one or more targeted object modules are selected from a library of targeted object recognition modules that is remote from the robot based on the assigned task;
determine that the downloading is complete;
after determining that the downloading is complete, operate the robot to travel outside of the range of the wireless access point into the area;
obtain, from one or more vision sensors integral with the robot, vision data capturing, from a perspective of the robot, at least a portion of the second area;
determine, at the robot based on the vision data and the one or more downloaded object recognition modules, information about an object in the second area that is detected in the vision data captured by the one or more vision sensors integral with the robot; and
operate the robot to perform the assigned task.

11. The system of claim 10, wherein the one or more targeted object modules are selected from the library based at least in part on one or more expected objects or object types associated with the assigned task.

12. The system of claim 10, wherein the one or more targeted object recognition modules are selected from the library based at least in part on available resources of the robot.

13. The system of claim 10, wherein the one or more targeted object recognition modules are selected from the library based at least in part on the vision data.

14. The system of claim 10, wherein the one or more targeted object recognition modules are selected from the library by the object recognition client.

15. The system of claim 10, wherein the one or more targeted object recognition modules are selected from the library by the remote computing system based on one or more attributes of the assigned task provided to the remote computing system by the object recognition client.

16. At least one non-transitory computer-readable medium comprising instructions that, in response to execution of the instructions by one or more processors integral with a robot, cause the one or more processors to perform the following operations:
determining an assigned task to be performed by the robot;
determining a range of a wireless access point through which the robot is able to engage in wireless network communication with a remote computing system;
determining that the assigned task requires the robot to travel to an area that is outside of the range of the wireless access point, such that the robot will be unable to engage in wireless network communication with the remote computing system while in the area;
based on the assigned task, and while the robot is within the range of the wireless access point, downloading, to the robot from the remote computing system, one or more targeted object recognition modules, wherein each targeted object recognition module is usable by the object recognition client to calculate, at the robot, an object type or pose of an observed object, and wherein the one or more targeted object modules are selected from a library of targeted object recognition modules that is remote from the robot based on the assigned task;
determining that the downloading is complete;
after determining that the downloading is complete, operating the robot to travel outside of the range of the wireless access point into the area;
obtaining, from one or more vision sensors integral with the robot, vision data capturing, from a perspective of the robot, at least a portion of the second area;
determining, at the robot based on the vision data and the one or more downloaded object recognition modules, information about an object in the second area that is detected in the vision data captured by the one or more vision sensors integral with the robot; and
operating the robot to perform the assigned task.

17. The method of claim 1, further comprising:
operating the robot to travel towards the area outside of the range of the wireless access point during the downloading;
determining that the robot is proximate an edge of the range of the wireless access point before determining that the downloading is complete; and
operating the robot to cease moving until determining that the downloading is complete.

\* \* \* \* \*